T864003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 729

749,327

CYCLOHEXANE-1,4-DICARBOXYLATE ESTERS AS PLASTICIZERS

Lloyd P. Foster, P.O. Box 511,
Kingsport, Tenn. 37662

Filed Aug. 1, 1968. Published July 15, 1969
Int. Cl. C08f *45/40*
U.S. Cl. 260—31.8
No Drawing. 9 Pages Specification

Dialkyl cyclohexanedicarboxylate esters, including the 1,4; 1,3; and 1,2 positional isomers, and preferably those containing the carboxylic acid groups in the 1 and 4 positions are plasticizers which produce superior properties when compared to phthalic esters. The alkyl portions of the ester may contain from 1 to about 40 carbons, and preferably from about 4 to about 20. The amount of the plasticizer may of course vary widely depending upon the type of resin and the use requirements. Usually from about 20 to 100 parts of plasticizer per 100 parts of resin is satisfactory for most purposes.